Dec. 30, 1969

R. NEWSTEDER 3,487,440

SUBMERGED WATER TREATING DEVICE FOR AQUARIA

Filed April 9, 1968

INVENTOR:
ROBERT NEWSTEDER

BY Robert Henderson

ATTORNEY

United States Patent Office 3,487,440
Patented Dec. 30, 1969

3,487,440
SUBMERGED WATER TREATING DEVICE FOR AQUARIA
Robert Newsteder, 5 Valley Way,
West Orange, N.J. 07052
Filed Apr. 9, 1968, Ser. No. 719,889
Int. Cl. E04h *3/20*
U.S. Cl. 210—169
9 Claims

ABSTRACT OF THE DISCLOSURE

A water treating chamber is provided with separate, readily serviceable and separately replaceable units for filtering and purifying the water; said units having opposite, relatively large entrance and exit areas and being so arranged that water passes sequentially and unidirectionally therethrough.

Background of the invention

Submerged water treating devices for aquaria commonly employ substances such as, for example, glass wool or other suitable fibrous material and charcoal which serve, respectively, to filter and purify water circulated therethrough; and many such devices employ a porous stone for dispersing pumped air in bubbles toward or into a lower portion of an upright tube wherein their ascent causes continuous circulation of the water of the aquarium through the water treating device. The bubbles also serve to aerate the water.

In such devices, the glass wool and charcoal (or operatively equivalent materials) become somewhat laden with dirt and/or other deleterious matter and require frequent replacement. A porous stone may also, but less frequently, become somewhat clogged, thereby reducing the air flow and the circulation of the water through the device. Then, the stone should be replaced.

Where both fibrous material and charcoal have been used, both these substances are usually disposed within a single unit in intimate proximity to each other. One of these two substances ordinarily requires replacement before the other, but, when the two are in the same unit, the person servicing the device and replacing only one of the substances is subject to some inconvenience by reason of the necessity of confining the other of the substances in its proper location in the unit. Moreover, the unit, with both these types of water treating substances, must be bodily removed from the water, to effect the necessary servicing.

The fibrous material and the charcoal are often disposed within a single unit designed to be removed and thrown away when either of said materials becomes overladen with filtered-out dirt or other deleterious material. This usually results in premature discarding of one or the other material still having a considerable, remaining water treating capability.

It appears, also, that intimate disposition of the fibrous material and charcoal causes some impediment to the flow of water through the water treating device.

General features of this invention

An important object of this invention is, in general, to provide an improved water treating device, and, more specifically, to overcome at least some, and, preferably, all of the just mentioned shortcomings of prior water treating devices. This object is achieved by the arrangement recited in the foregoing Abstract of the Disclosure, and more particularly, by providing a base or body member with suitable receptacles for receiving separate, preferably spaced, units for fibrous material and for charcoal. The body member and said units are so designed that either one of said units may be lifted out of the body member for servicing or replacement without in any way handling the other of said units.

If, as is preferable, a porous air dispersing stone is employed, it may be mounted separately within the body member, and the latter may be arranged to pivot from or be otherwise separable from an underlying plate, to afford access to the stone for replacement of the latter.

The drawing

A device according to a preferred embodiment of the invention is shown in the drawing for illustrative purposes and without limitation.

Description of the illustrated device

Figure 1:
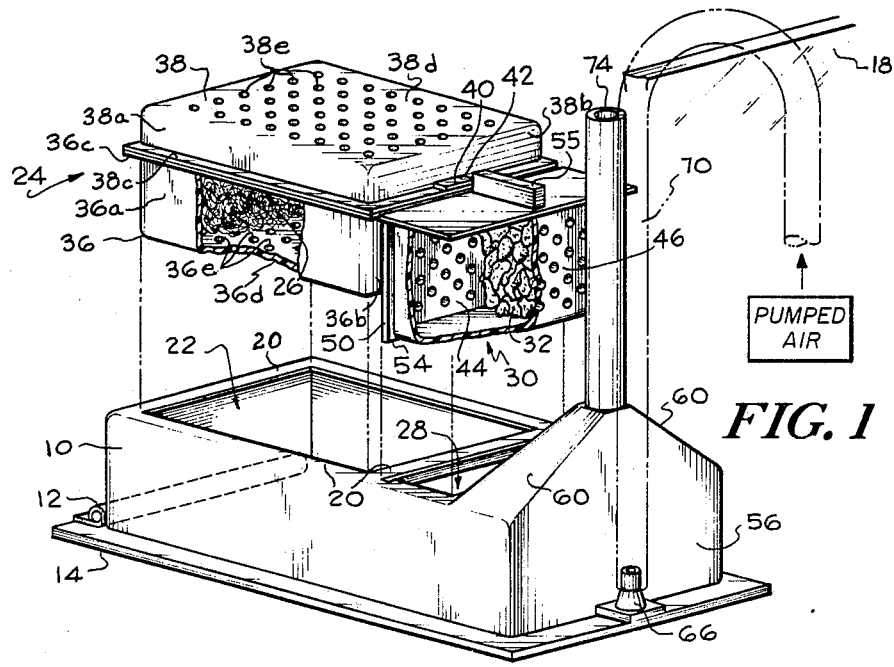
FIG. 1 is an exploded perspective view of said embodiment, partly broken away to show certain details clearly, and including, fragmentarily, an upper edge of a glass wall of an aquarium in which the device is disposed.

A box-like base or body member 10 is hingedly connected by hinge 12 to a bottom plate 14 which rests upon the bottom of a related aquarium tank or upon a bed of gravel or other suitable bed material in the tank. Of the tank, only a bottom member 16 and a glass side or end wall 18 are shown in the drawing.

An upper wall 20 of body member 10 is formed with a large rectangular opening 22 for receiving therewithin, with a close fit, a rectangular box 24 constituting a unit for holding suitable fibrous filtering material 26 therewithin.

The body member's upper wall 10 is formed, also, with a second, somewhat smaller rectangular opening 28 for receiving therewithin, with a close fit, a second rectangular box 30 constituting a unit for holding charcoal 32 therewithin.

The openings 22 and 28, as illustrated, are equal in dimension with respect to the width of the base member 10 and are in alignment longitudinally of the latter. The said openings are so spaced and the units 24 and 30 so designed that a space 34 is preferably provided between the two said units.

The fibrous material containing unit 24 may advantageously be made of relatively thin, somewhat resilient plastic material. It comprises a relatively deep, rectangular, bottom member 36, side and end walls 36a and 36b of which are formed with lateral flanges 36c which rest upon the body member's upper wall 20 to limit the extent of downward insertion of the unit 24 into the opening 22. A bottom wall 36d of the bottom member 36 is integral with the walls 36a and 36b at the latters' lower limits. Said bottom wall is formed with a plurality of apertures 36e and is spaced considerably above the plate 14 to provide, in the body member 10, a water space 37 communicating with the water space 34.

The unit 24 is also provided with a cover member 38 which is inverted relatively to the bottom member 36 and is fastened down upon the latter. It is shallower than the bottom member, but, otherwise, is substantially similar thereto. More particularly, the cover member 38 has a top wall 38d having plural apertures 38e therein and said top wall is integral with side walls 38a and end walls 38b. These side and end walls terminate in lateral flanges 38c which match with and firmly engage the flanges 36c of the bottom member 36.

The bottom and cover members 36 and 38 of the unit 24 are held together by lugs 40, fixed centrally to end walls 36b and projecting horizontally from and above said end walls in spaced relation thereto. These lugs project into mating slots 42 in the end walls 38b of the cover member 38, thereby locking the members 36 and 38 together.

The bottom member 36 of the unit 24 fits with a preferably light friction fit within the aperture 22 thereby maintaining the unit 24 adequately associated with the base member 10. If desired, the unit 24 may be weighted or suitably latched to the base member to give further assurance against unintended dislodgement of said unit.

It will be apparent that the unit 24 may easily be lifted bodily from the body member 10 and removed from the aquarium for servicing. After the unit 24 is thus disassociated from the aquarium, inward pressure on the flexible end walls 36b of the bottom member 24 causes the lugs 40 to withdraw inwardly from the slots 42 in the cover member 38 whereupon the latter may be removed to give access to the fibrous material 26.

After replacement of the fibrous material, the cover member 38 can be restored to its place upon the bottom member 36 by again flexing the end walls 36b inwardly, and then permitting them to re-flex outwardly to again engage the lugs 40 within the slots 42.

Then, the serviced unit 24 is returned to its place in the opening 22.

The charcoal containing unit 30 is similar to unit 24 in that it may advantageously be of plastic material, is a box, and is insertable and removable vertically with reference to its related opening 28. It has relatively large side walls 44, 46 similarly provided with plural apertures 48 therein. The walls 44, 46 extend transversely of the base member 10 and are of such size as to substantially block off transversely the inner area of the body member wherein the unit 24 is located.

To assure such blocking, the wall 44 may include opposite, vertical side flanges 50 (only one being shown and visible in FIG. 1) intimately overlapping opposite, inwardly extending, vertical flanges 52 formed on the inner surfaces of the side walls of the base member 10. Only one of the flanges 52 is indicated in broken lines in FIG. 2. A water blocking flange 54 is also preferably provided at the bottom of wall 44 to engage the bottom plate 14.

The box unit 30 may be designed for opening and closing to permit replacement of charcoal. However, charcoal only needs replacement relatively infrequently, therefore, the box 30 is illustrated as being sealed closed with its carbon charge therein. Such a unit is relatively inexpensive. When replacement becomes necessary, the box 30 may be lifted from the body member 10 by a top, integral tab 55 and discarded. Then a new charcoal-loaded box 30 is placed in the body member 10 to replace the discarded box unit.

Figure 2:
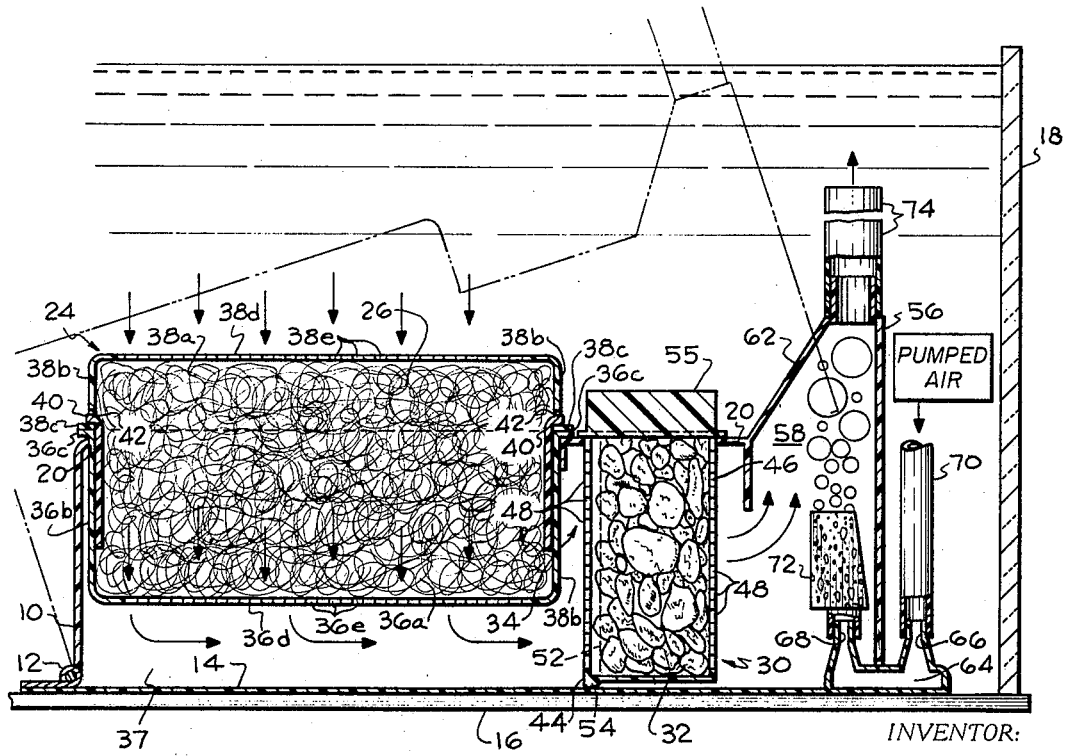
FIG. 2 is a central, vertical, longitudinal, sectional view of the device.

The area within body member 10, between the box unit 30, end wall 56 of the body member, and adjacent portions of opposite side walls of the body member, constitutes an air circulating chamber 58 having tapered upper walls 60 (FIG. 1) and 62 (FIG. 2).

Integral with the bottom plate 14 is an air passage 64 in the shape of an inverted U having an air inlet nipple 66 outside of the body member's adjacent end wall 56 and an air outlet nipple 68 inside of said end wall and leading into the chamber 58. A suitable tube 70 serves to connect the nipple 66 to an air pump (not shown) outside of the aquarium, and a partially hollowed porous stone 72 is press-fitted to the nipple 68.

A vertical water-flow tube 74 is fixed to the upper end of wall portions 56, 60 and 62 in communication with the chamber 58. The upper end of the tube 72 should always be submerged as indicated in FIG. 2 to enable the disclosed device to operate.

The body member 10 may be suitably made readily separable from the bottom plate 14 as, for example, by the illustrated hinge arrangement 12 which permits the body member to be raised to its chain-line indicated position (FIG. 2) to afford access to the stone 72 for replacement thereof when desirable.

Operation of the illustrated device

After air, pumped continuously through tube 70, enters the porous stone 72, it emerges from the latter in a myriad of bubbles which rise in the chamber 58 and the tube 74, thereby inducing continuous upward movement of the water in said tube and resultant continuous drawing of water into said chamber from other parts of the device.

The movement of water through the device is indicated by arrows from which it should be understood that water in the aquarium, above the subject device, flows vertically downwardly through the fibrous material unit 24 into the space 37 below said unit. From said space, the water flows horizontally to the charcoal box 30 and, because of the space 34, the water is free to move through the entire apertured area of said box's wall 44, thence through the charcoal 32 and apertured wall 46, into the chamber 58, whence, as already explained, it rises into and from the tube 74 by reason of the described bubbling action.

It will be realized that all water circulating through the device is positively constrained to pass through the two units 24 and 30 and that in passing through the chamber 58 and tube 74, it is well aerated.

Thus, all water, moving from this device into the surrounding body of water in the aquarium tank, has been filtered, purified and aerated. Also, as the units 24 and 30 are separated, they do not give rise to any cumulative impeding effect upon the circulation of water through the device. Additionally, as the circulating water enters and exits through opposite, broader, apertured walls of the units 24 and 30, those units are capable of conducting the water therethrough in substantial volume.

Optionally, either or both of the units 24 and 30, with their respective filtering and water treating contents, may be made as inexpensively replaceable throw away units.

I claim:

1. A submerged water treating device for use in an aquarium, comprising a substantially closed, hollow, body member having a wall formed with a substantial open area; a first water treating unit, with water treating material therein, removably fitted to said wall in ore marginal portion of said open area with the greater part of said unit projected into said body member; a second water treating unit, with water treating material therein, removably fitted to said wall in an opposite marinal portion of said open area with the greater part of said second unit projected into said body member; the parts of said units which project into the body member being separated to provide a water area therebeween; one of said units having opposite, apertured walls, one of which is an input wall at the exterior of the device and the other of which is an output wall partially defining said water area, the other of said units having opposite, apertured input and output walls both of which are within said body portion, the latter input wall partially defining said water area, and marginal wall portions of both said units being in such intimate, association with wall surfaces of said body member as to constrain substantially all water moving into and out of said body member to pass sequentially and unidirectionally through the water treating material in the two said units.

2. A submerged water treating device for use in an aquarium, comprising a substantially closed, hollow, body member having a wall formed with an open area therein; a water filtering unit, with filtering material therein, removably fitted in said open area; a separate water purifying unit, with purifying material therein, removably fitted in said open wall area in side-by-side spaced relation to said filtering unit and in water sealed relation to the latter unit at said wall; one of said units having opposed apertured walls permitting movement of water therethrough between the exterior of said body member and a water area between said units and within said body member, one of said apertured walls being directly exposed to water at the exterior of said body member and the other of said apertured walls being directly exposed to water within said body member; the other of said units having opposed apertured walls permitting movement of water therethrough between said water area and the exterior of said body member, both latter apertured walls being immersed in water within said body member; and the device further comprising water moving means, within said body member, coacting with said body member and with said units to move water sequentially and unidirectionally through the two said units.

3. A water treating device according to claim 2, the open area of said wall of the body member being divided into two openings and said units being separately disposed in said openings.

4. A water treating device according to claim 2, said apertured walls of said one unit being disposed horizontally to permit vertical flow of water therethrough, and said apertured walls of said other unit being disposed vertically to permit horizontal flow of water therethrough.

5. A water treating device according to claim 2, said wall with the open area therein being a horizontal top wall of the body member, and said units being separately liftable from said open area.

6. A water treating device according to claim 2, the opposed apertured walls of said other unit being vertically disposed, said water area being at one side of said other unit, and said body member being formed to define an air circulating chamber, constituting a part of said water moving means, at the other side of said other unit.

7. A submerged water treating device for use in an aquarium, comprising a substantially closed, hollow, body member having a wall formed with an open area therein; a water filtering unit, with filtering material therein, removably fitted in said open area; a separate water purifying unit, with purifying material therein, removably fitted in said open wall area in side-by-side relation to said filtering unit and in water sealed relation to the latter unit at said wall; one of said units having opposed apertured walls permitting movement of water therethrough between the exterior of said body member and a water area between said units and within said body member, one of said apertured walls being directly exposed to water at the exterior of said body member and the other of said apertured walls being directly exposed to water within said body member; the other of said units having opposed apertured walls permitting movement of water therethrough between said water area and the exterior of said body member, both latter apertured walls being immersed in water within said body member; the opposed apertured walls of said other unit being vertically disposed, said water area being at one side of said other unit, said body member being formed to define an air circulating chamber at the other side of said other unit; said units and chamber being in alignment longitudinally of said body member.

8. A submerged water treating device for use in an aquarium, comprising a substantially closed, hollow, body member having a wall formed with an open area therein; a water filtering unit, with filtering material therein, removably fitted in said open area; a separate water purifying unit, with purifying material therein, removably fitted in said open wall area in side-by-side relation to said filtering unit and in water sealed relation to the latter unit at said wall; one of said units having opposed apertured walls permitting movement of water therethrough between the exterior of said body member and a water area between said units and within said body member, one of said apertured walls being directly exposed to water at the exterior of said body member and the other of said apertured walls being directly exposed to water within said body member; the other of said units having opposed apertured walls permitting movement of water therethrough between said water area and the exterior of said body member, both latter apertured walls being immersed in water within said body member; the opposed apertured walls of said other unit being vertically disposed, said water area being at one side of said other unit, said body member being formed to define an air circulating chamber at the other side of said other unit; said air circulating chamber having an upright, water-flow tube at its top and an air inlet at its bottom to circulate air upwardly in said chamber and tube and thereby cause circulation of water through and from said units and back into the water surrounding the device.

9. A water treating device according to claim 8, further including a porous stone fitted to said air inlet, and said body member being pivotable at a point removed from said air circulating chamber to afford access to said stone.

References Cited

UNITED STATES PATENTS

| | | | |
|---|---|---|---|
| 3,145,168 | 8/1964 | Scafuro | 210—169 |
| 3,255,731 | 6/1966 | Girard | 119—5 |
| 3,377,991 | 4/1968 | Rubert | 210—169 X |
| 2,980,256 | 4/1961 | Nash | 210—169 |

REUBEN FRIEDMAN, Primary Examiner

T. A. GRANGER, Assistant Examiner

U.S. Cl. X.R.

119—5